United States Patent
Kuo (10) Patent No.: US 8,581,880 B2
(45) Date of Patent: *Nov. 12, 2013

(54) CAPACITIVE TOUCH DISPLAY PANEL (75) Inventor: Chun-Ku Kuo, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 401 days.

This patent is subject to a terminal disclaimer.

(21) Appl. No.: 13/048,889

(22) Filed: Mar. 16, 2011

(65) Prior Publication Data

US 2012/0169647 A1    Jul. 5, 2012

(30) Foreign Application Priority Data

Dec. 30, 2010   (TW) .............................. 99147050 A (51) Int. Cl.
G06F 3/045 (2006.01)

(52) U.S. Cl.
USPC .......................................... 345/174; 345/173

(58) Field of Classification Search
USPC ............ 345/156, 173–175; 178/18.01–18.07, 178/19.01–19.05
See application file for complete search history.

(56) References Cited

U.S. PATENT DOCUMENTS

| | | |
|---|---|---|
| 2008/0165139 A1 | 7/2008 | Hotelling |
| 2010/0066683 A1 | 3/2010 | Chang |
| 2010/0149116 A1 | 6/2010 | Yang |
| 2011/0096018 A1 | 4/2011 | Lee |
| 2011/0128249 A1* | 6/2011 | Fan et al. ........................ 345/174 |
| 2011/0148780 A1* | 6/2011 | Lu et al. ......................... 345/173 |
| 2011/0157071 A1* | 6/2011 | Huang et al. ................... 345/174 |
| 2012/0081300 A1* | 4/2012 | Chan et al. ..................... 345/173 |
| 2012/0086655 A1* | 4/2012 | Wang et al. .................... 345/173 |
| 2012/0268402 A1* | 10/2012 | Wang et al. .................... 345/173 |

FOREIGN PATENT DOCUMENTS

| | | |
|---|---|---|
| CN | 101441538 A | 5/2009 |
| CN | 101706695 A | 5/2010 |
| JP | 2003315787 A | 11/2003 |
| TW | 200923536 | 6/2009 |
| TW | 200937076 | 9/2009 |
| TW | 201000966 | 1/2010 |
| TW | M381122 | 5/2010 |
| TW | 201022761 | 6/2010 |

* cited by examiner

Primary Examiner — Ricardo L Osorio (74) Attorney, Agent, or Firm — Winston Hsu; Scott Margo (57) ABSTRACT A capacitive touch display panel includes a display panel, an outer substrate, and a capacitive touch device. The capacitive touch device is disposed between the outer substrate and the display panel. The capacitive touch device includes a plurality of first transparent electrodes, at least one transparent bridge line, a plurality of second transparent electrodes, at least one non-transparent bridge line, and at least one patterned low reflective layer. The patterned low reflective layer is disposed on an opposite side of the non-transparent bridge line with respect to the display panel. The patterned low reflective layer and the non-transparent bridge line are overlapped to each other in a vertical projective direction.

31 Claims, 10 Drawing Sheets

CAPACITIVE TOUCH DISPLAY PANEL

BACKGROUND OF THE INVENTION

1. Field of the Invention

The present invention relates to a capacitive touch display panel, and more particularly, to a capacitive touch display panel with a patterned low reflective layer.

2. Description of the Prior Art

The touch panel has been widely used in the input interfaces of the instruments for its properties such as the great interaction between machines and humans. In recent years, more consumer electronics, such as mobile phones, GPS navigator systems, tablet computers, laptop computers, and personal digital assistances (PDA) are employed with touch display panels.

There are many diverse technologies of touch panel, and the resistance touch technology, the capacitive touch technology and the optical touch technology are the main touch technologies. The capacitive touch technology has become the mainstream touch technology for the high-end and the mid-end consumer electronics, because the capacitive touch panel has advantages such as high precision, multi-touch, better endurance, and higher touch resolution. In the capacitive touch technology, transparent electrodes are used to detect the variations of electrical capacitances around a touch point, and feedback signals are transmitted via connecting lines and bridge lines, which interconnect each of the transparent electrodes, along different axis directions for positioning the touch points. In the conventional capacitive touch technology, the bridge lines, which interconnect each of the adjacent transparent electrodes along an identical axis direction, are made of conductive materials different from the materials of the transparent electrodes. For better signal transmitting performances, the bridge lines are usually made of metals with lower electrical resistance. However, the display performance of the touch display panel may be affected because reflection light may be generated from the metal materials of the bridge line. An anti-reflection sheet may be attached on the touch display panel to reduce the reflection affect generated by the metal bridge lines, but the additional problems are higher manufacturing cost and thicker total thickness.

SUMMARY OF THE INVENTION

It is one of the objectives of the present invention to provide a capacitive touch display panel for improving the light reflection problem caused by the materials of the bridge lines in the capacitive touch display panel.

To achieve the purpose described above, a preferred embodiment of the present invention provides a capacitive touch display panel. The capacitive touch display panel includes a display panel, an outer substrate, and a capacitive touch device. The display panel has a display surface, and the outer substrate is disposed on the display surface of the display panel. The capacitive touch device is disposed between the outer substrate and the display panel. In addition, the capacitive touch device comprises a plurality of first transparent electrodes, at least one transparent bridge line, a plurality of second transparent electrodes, at least one non-transparent bridge line, and at least one patterned low reflective layer. The first transparent electrodes are disposed on the outer substrate along a first direction. The transparent bridge line is disposed on the outer substrate and electrically connected to two adjacent first transparent electrodes. The second transparent electrodes are disposed on the outer substrate along a second direction. The non-transparent bridge line is disposed on the outer substrate and partially overlaps two adjacent second transparent electrodes for being electrically connected to the two adjacent second transparent electrodes. The patterned low reflective layer is disposed on a side of the non-transparent bridge line opposite to the display panel. The patterned low reflective layer is disposed between the outer substrate and the non-transparent bridge line, and the patterned low reflective layer overlaps the non-transparent bridge line in a vertical projective direction.

To achieve the purpose described above, another preferred embodiment of the present invention provides a capacitive touch display panel. The capacitive touch display panel includes a display panel and a capacitive touch device. The display panel includes an upper substrate and a display surface. The capacitive touch device is disposed on the upper substrate of the display panel, and disposed on the display surface of the display panel. In addition, the capacitive touch device includes a plurality of first transparent electrodes, at least one transparent bridge line, a plurality of second transparent electrodes, at least one non-transparent bridge line, and at least one patterned low reflective layer. The first transparent electrodes are disposed on the upper substrate along a first direction. The transparent bridge line is disposed on the upper substrate and electrically connected to two adjacent first transparent electrodes. The second transparent electrodes are disposed on the upper substrate along a second direction. The non-transparent bridge line is disposed on the upper substrate and partially overlaps two adjacent second transparent electrodes for being electrically connected to the two adjacent second transparent electrodes. In addition, the patterned low reflective layer is disposed on a side of the non-transparent bridge line opposite to the display panel. The non-transparent bridge line is disposed between the patterned low reflective layer and the upper substrate. The patterned low reflective layer overlaps the non-transparent bridge line in a vertical projective direction.

To achieve the purpose described above, further another preferred embodiment of the present invention provides a capacitive touch display panel. The capacitive touch display panel includes a liquid crystal display panel, a capacitive touch device, a polarizing film, an adhesive layer, and an outer substrate. The liquid crystal display panel includes an upper substrate and a display surface. The capacitive touch device is disposed on the upper substrate of the liquid crystal display panel, and disposed on the display surface of the liquid crystal display panel. In addition, the capacitive touch device includes a plurality of first transparent electrodes, at least one transparent bridge line, a plurality of second transparent electrodes, at least one non-transparent bridge line, a passivation layer, and at least one patterned low reflective layer. The first transparent electrodes are disposed on the upper substrate along a first direction. The transparent bridge line is disposed on the upper substrate and electrically connected to two adjacent first transparent electrodes. The second transparent electrodes are disposed on the upper substrate along a second direction. The non-transparent bridge line is disposed on the upper substrate and partially overlaps two adjacent second transparent electrodes for being electrically connected to the two adjacent second transparent electrodes. The passivation layer covers the first transparent electrodes, the second transparent electrodes, the transparent bridge line, and the non-transparent bridge line. The patterned low reflective layer is disposed on a side of the non-transparent bridge line opposite to the display panel. The non-transparent bridge line is disposed between the patterned low reflective layer and the upper substrate, and the patterned low reflective layer overlaps the non-transparent bridge line in a vertical projective direction. Additionally, the polarizing film is disposed on the capacitive touch device, the adhesive layer is disposed on the polarizing film, and the outer substrate is disposed on the adhesive layer.

To achieve the purpose described above, further another preferred embodiment of the present invention provides a capacitive touch display panel. The capacitive touch display panel includes a display panel, an auxiliary substrate, and a capacitive touch device. The display panel includes an upper substrate and a display surface. The auxiliary substrate is disposed on the upper substrate of the display panel, and disposed on the display surface of the display panel. The capacitive touch device is disposed on the auxiliary substrate. In addition, the capacitive touch device includes a plurality of first transparent electrodes, at least one transparent bridge line, a plurality of second transparent electrodes, at least one non-transparent bridge line, a passivation layer, and at least one patterned low reflective layer. The first transparent electrodes are disposed on the auxiliary substrate along a first direction. The transparent bridge line is disposed on the auxiliary substrate for being electrically connected to two adjacent first transparent electrodes. The second transparent electrodes are disposed on the auxiliary substrate along a second direction. The non-transparent bridge line is disposed on the auxiliary substrate and partially overlaps two adjacent second transparent electrodes for being electrically connected to the two adjacent second transparent electrodes. Additionally, the patterned low reflective layer is disposed on a side of the non-transparent bridge line opposite to the display panel, and the non-transparent bridge line is disposed between the patterned low reflective layer and the auxiliary substrate. The patterned low reflective layer overlaps the non-transparent bridge line in a vertical projective direction.

To achieve the purpose described above, further another preferred embodiment of the present invention provides a capacitive touch display panel. The capacitive touch display panel includes a substrate and a capacitive touch device. The capacitive touch device is disposed on the substrate. In addition, the capacitive touch device includes a plurality of transparent electrodes, at least one non-transparent bridge line, and at least one patterned low reflective layer. The transparent electrodes are disposed on the substrate. The non-transparent bridge line is disposed on the substrate, and partially overlaps two adjacent transparent electrodes for being electrically connected to the two adjacent transparent electrodes. Additionally, the patterned low reflective layer is disposed on the substrate, and the patterned low reflective layer overlaps the non-transparent bridge line in a vertical projective direction.

To achieve the purpose described above, further another preferred embodiment of the present invention provides a capacitive touch display panel. The capacitive touch display panel includes an outer substrate and a capacitive touch device. The outer substrate has an inner surface. The capacitive touch device is disposed on the inner surface of the outer substrate. The capacitive touch device includes at least one patterned low reflective layer, at least one non-transparent bridge line, and a plurality of transparent electrodes. The patterned low reflective layer is disposed on the inner surface of the outer substrate. The non-transparent bridge line is disposed over the patterned low reflective layer, and the patterned low reflective layer and the non-transparent bridge line are overlapped in a vertical projective direction. The transparent electrodes are disposed on the outer substrate, and the non-transparent bridge line partially overlaps two adjacent transparent electrodes for being electrically connected to the two adjacent transparent electrodes.

In the present invention, the patterned low reflective layer is employed to improve the light reflection problem caused by the materials of the bridge lines in the capacitive touch display panel. Therefore, the display performance of the capacitive touch display panel may not be affected, and the manufacturing cost and the thickness level may not be affected also.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to skilled users in the technology of the present invention, preferred embodiments will be detailed as follows. The preferred embodiments of the present invention are illustrated in the accompanying drawings with numbered elements to elaborate the contents and effects to be achieved.

Figure 1:
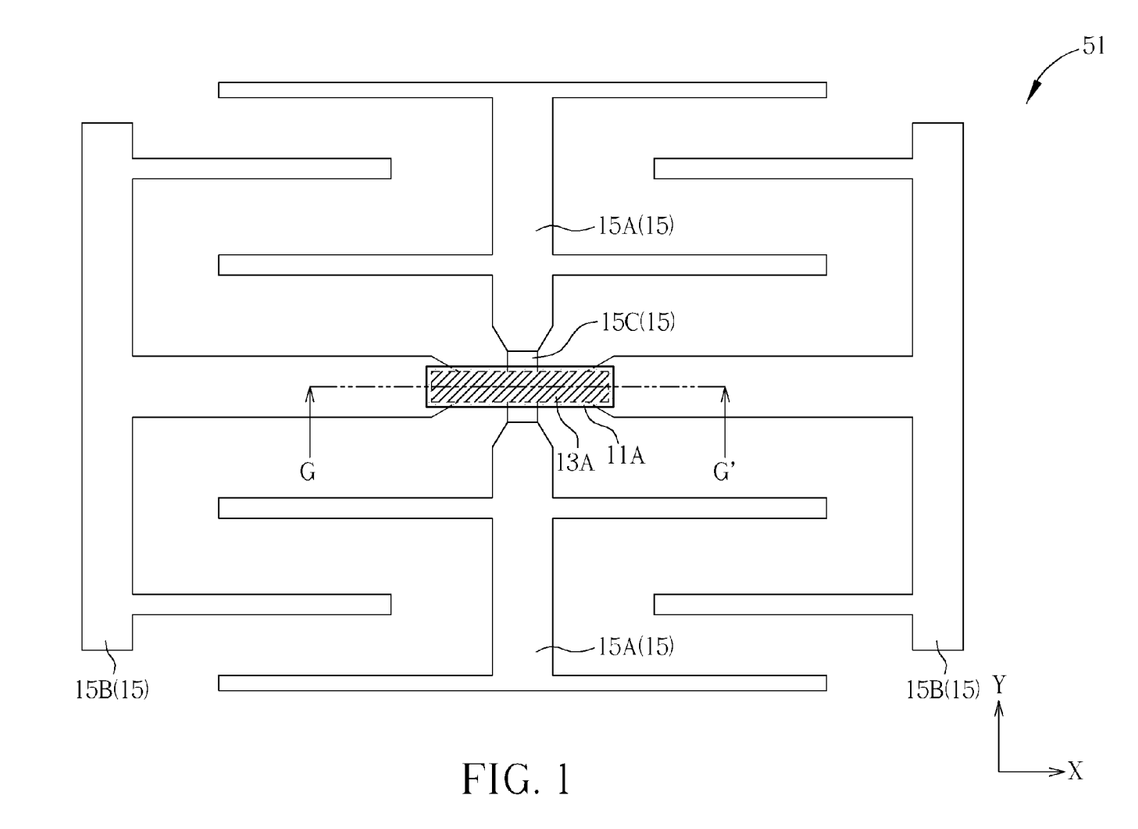
FIG. 1 is a schematic diagram illustrating a top view of a capacitive touch display panel according to the first and the second preferred embodiments of the present invention.
Figure 2:
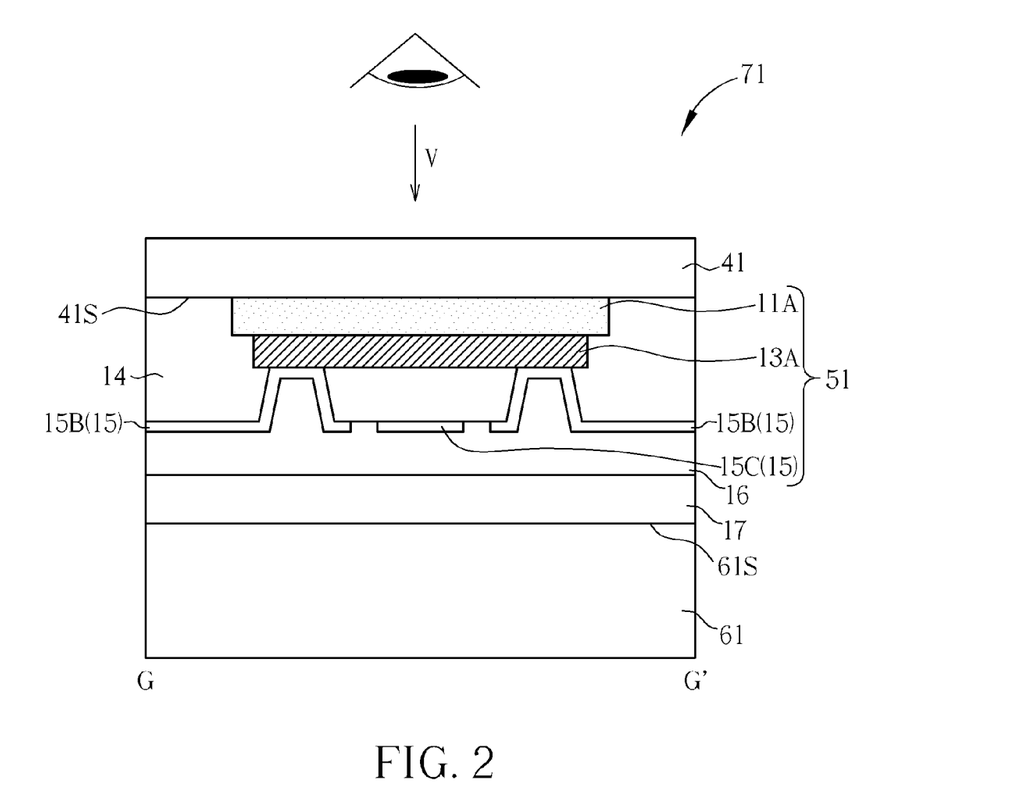
FIG. 2 is a schematic diagram illustrating is a cross-sectional view of a capacitive touch display panel along a line G-G' in FIG. 1 according to the first preferred embodiment of the present invention.

Please refer to FIGS. 1-2. FIG. 1 is a schematic diagram illustrating a top view of a capacitive touch display panel according to the first and the second preferred embodiments of the present invention. FIG. 2 is a schematic diagram illustrating is a cross-sectional view of a capacitive touch display panel along a line G-G' in FIG. 1 according to the first preferred embodiment of the present invention. For emphasizing the main features of the capacitive touch display panel of the present invention, some other components are not illustrated in FIG. 1. As shown in FIGS. 1-2, the capacitive touch display panel 71 includes a display panel 61, an outer substrate 41, and a capacitive touch device 51. The display panel 61 has a display surface 61S facing the outer substrate 41, and the outer substrate 41 is disposed on the display surface 61S of the display panel 61. In this embodiment, the display panel 61 may include a liquid crystal display panel, an electroluminescent display panel, an electrophoretic display panel, or a plasma display panel, but the present invention is not limited to this. The capacitive touch device 51 is disposed between the outer substrate 41 and the display panel 61. The capacitive touch device 51 is disposed on an inner surface 41S of the outer substrate 41. In addition, the capacitive touch device 51 includes a plurality of first transparent electrodes 15A, at least one transparent bridge line 15C, a plurality of second transparent electrodes 15B, at least one non-transparent bridge line 13A, and at least one patterned low reflective layer 11A. As shown in FIGS. 1-2, the first transparent electrodes 15A are disposed on the outer substrate 41 along a first direction Y, and the second transparent electrodes 15B are disposed on the outer substrate 41 along a second direction X. Additionally, the transparent bridge line 15C is disposed on the outer substrate 41 and electrically connected to two adjacent first transparent electrodes 15A, and the non-transparent bridge line 13A is disposed on the outer substrate 41 and partially overlaps two adjacent second transparent electrodes 15B for being electrically connected to the two adjacent second transparent electrodes 15B. The patterned low reflective layer 11A is disposed on a side of the non-transparent bridge line 13A opposite to the display panel 61. The patterned low reflective layer 11A is disposed between the outer substrate 41 and the non-transparent bridge line 13A, and the patterned low reflective layer 11A overlaps the non-transparent bridge line 13A in a vertical projective direction V that is substantially perpendicular to the display surface 61S. In this embodiment, it is worth noticing that an area of the patterned low reflective layer 11A is substantially larger than or equal to an area of the non-transparent bridge line 13A, and the non-transparent bridge line 13A is completely covered by the patterned low reflective layer 11A for effectively preventing the reflection light from being generated by the non-transparent bridge line 13A. In this embodiment, the first transparent electrodes 15A, the transparent bridge lines 15C, and the second transparent electrodes 15B are made of an identical patterned transparent conductive layer 15, but the first transparent electrodes 15A, the transparent bridge lines 15C, and the second transparent electrodes 15B in this invention are not limited to be made of an identical material. In each of the embodiments of the present invention, a material of the patterned transparent conductive layer 15 may include such as indium tin oxide (ITO), indium zinc oxide (IZO), aluminum zinc oxide (AZO), or other appropriate transparent conductive materials. Additionally, a material of the patterned low reflective layer 11A may include a black light-shielding material, such as black resin, chromium oxide ($CrO_x$), or chromium oxynitride ($CrO_xN_y$), but the patterned low reflective layer 11A of the present invention is not limited to this and may be made of other low reflective materials with appropriate optical density (OD) for effectively blocking the environment light from reaching the non-transparent bridge line 13A. As shown in FIG. 2, in this embodiment, the capacitive touch display panel 71 may further include a first insulating layer 14, a passivation layer 16, and an adhesive layer 17. The first insulating layer 14 is disposed between the non-transparent bridge line 13A and the transparent bridge line 15C. The passivation layer 16 is disposed between the capacitive touch device 51 and the adhesive layer 17. The adhesive layer 17 is disposed between the display panel 61 and the capacitive touch device 51 for combining the display panel 61 with the capacitive touch device 51 to form the capacitive touch display panel 71. In this embodiment, the capacitive touch display panel 71 is one kind of out-cell touch display panels. In other words, the capacitive touch device 51 may be formed firstly on the outer substrate 41, and the capacitive touch display panel 71 may then be formed by combining the capacitive touch device 51 and the display panel 61 with the adhesive layer 17.

The capacitive touch display panel of the present invention is not limited to the above-mentioned embodiment. The following description will detail the different embodiments of the capacitive touch display panel in the present invention. To simplify the description, the identical components in each of the following embodiments are marked with identical symbols. For making it easier to compare the difference between the embodiments, the following description will detail the dissimilarities among different embodiments and the identical features will not be redundantly described.

Figure 3:
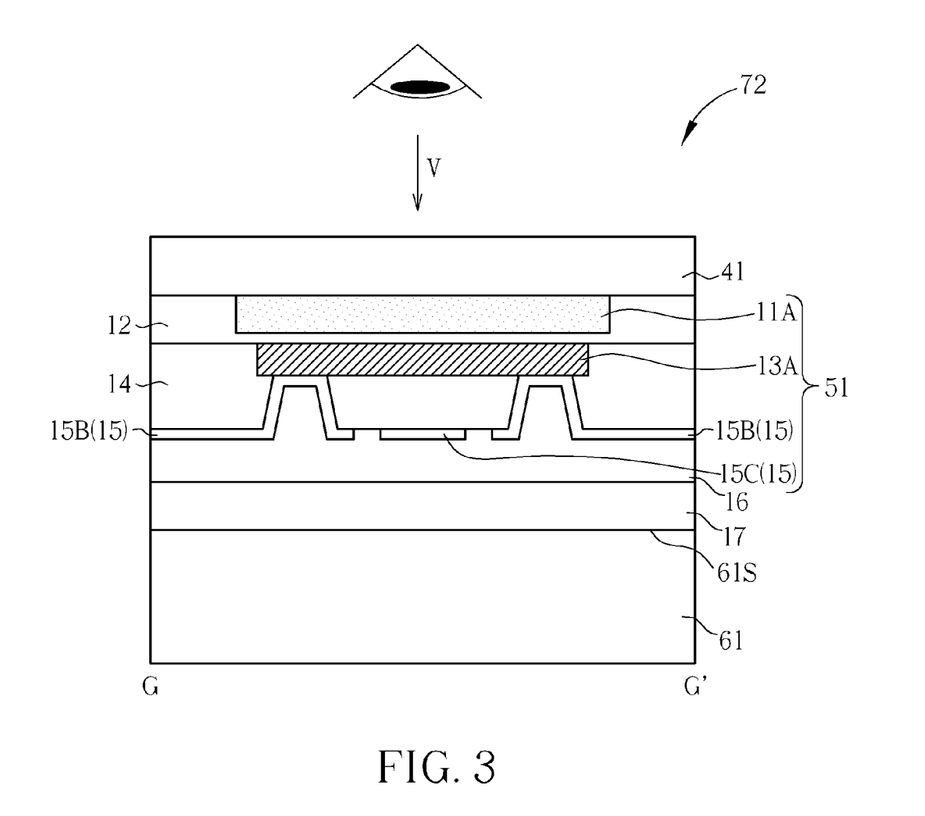
FIG. 3 is a schematic diagram illustrating is a cross-sectional view of a capacitive touch display panel along a line G-G' in FIG. 1 according to the second preferred embodiment of the present invention.

Please refer to FIG. 3, and refer to FIG. 1 together. FIG. 1 is a schematic diagram illustrating a top view of a capacitive touch display panel according to the second preferred embodiments of the present invention. FIG. 3 is a schematic diagram illustrating is a cross-sectional view of a capacitive touch display panel along a line G-G' in FIG. 1 according to the second preferred embodiment of the present invention. As shown in FIG. 1 and FIG. 3, the capacitive touch display panel 72 includes a display panel 61, an outer substrate 41, a first insulating layer 14, a second insulating layer 12, a passivation layer 16, an adhesive layer 17, and a capacitive touch device 51. The display panel 61 has a display surface 61S, and the outer substrate 41 is disposed on the display surface 61S of the display panel 61. In this embodiment, the display panel 61 may include a liquid crystal display panel, an electroluminescent display panel, an electrophoretic display panel, or a plasma display panel, but the present invention is not limited to this. The capacitive touch device 51 is disposed between the outer substrate 41 and the display panel 61. In addition, the capacitive touch device 51 includes a plurality of first transparent electrodes 15A, at least one transparent bridge line 15C, a plurality of second transparent electrodes 15B, at least one non-transparent bridge line 13A, and at least one patterned low reflective layer 11A. The patterned low reflective layer 11A is disposed on a side of the non-transparent bridge line 13A opposite to the display panel 61. The patterned low reflective layer 11A is disposed between the outer substrate 41 and the non-transparent bridge line 13A, and the patterned low reflective layer 11A overlaps the non-transparent bridge line 13A in a vertical projective direction V substantially perpendicular to the display surface 61S. In addition, the second insulating layer 12 is disposed between the non-transparent bridge line 13A and the patterned low reflective layer 11A. In this embodiment, except to the second insulating layer 12, other components' allocation and material properties are identical to those of the first embodiment mentioned above and will not be redundantly described. In this embodiment, the capacitive touch display panel 72 is one kind of the out-cell touch display panels. It is worth noticing that, in this embodiment, the second insulating layer 12 are used to avoid manufacturing problems, which may be generated during the process of forming the non-transparent bridge line 13A directly on the patterned low reflective layer 11A. The second insulating layer 12 is used to cover the patterned low reflective layer 11A, and the non-transparent bridge line 13A is formed subsequently.

Figure 4:
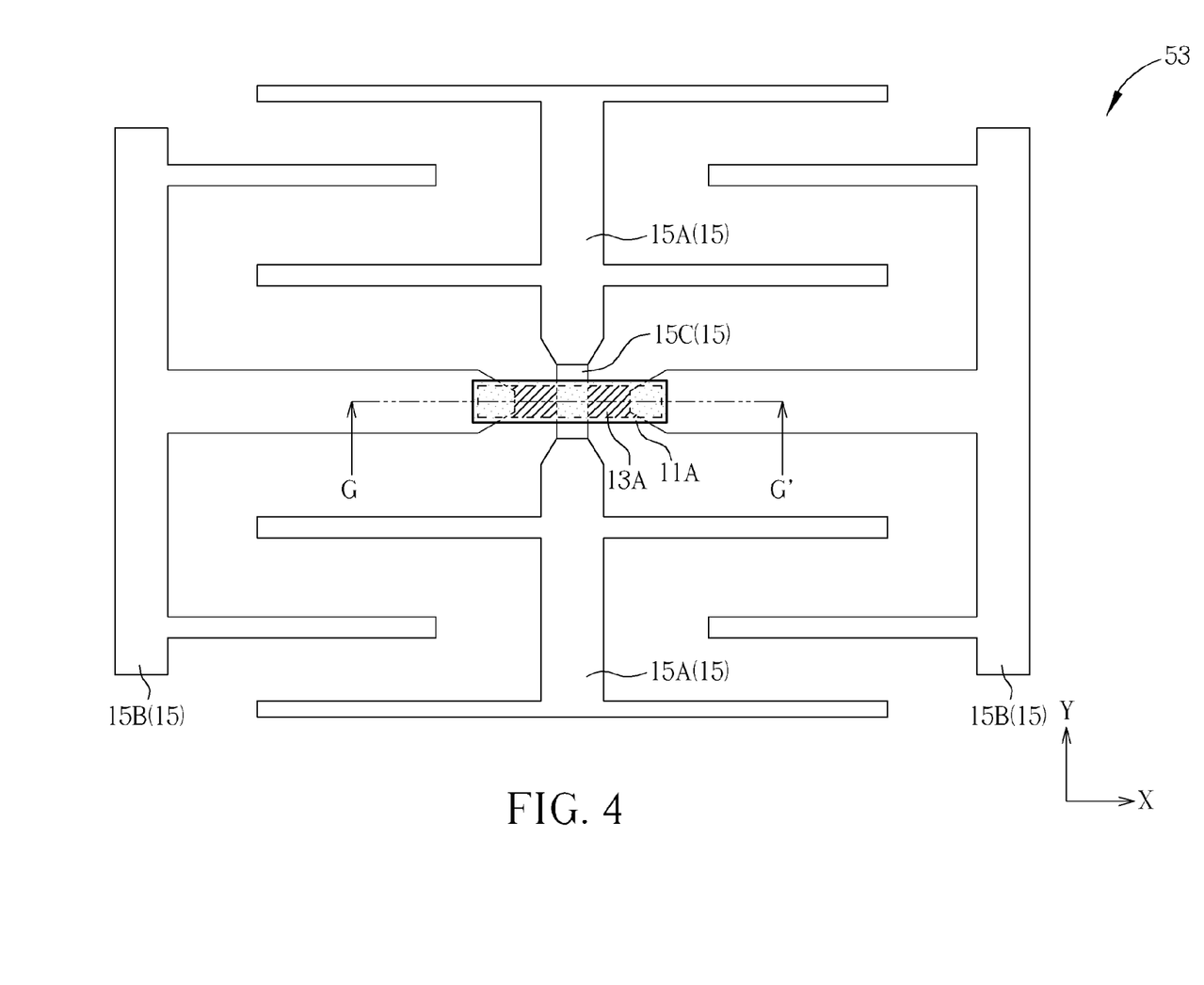
FIG. 4 is a schematic diagram illustrating a top view of a capacitive touch display panel according to the third, the fourth, and the fifth preferred embodiments of the present invention.
Figure 5:
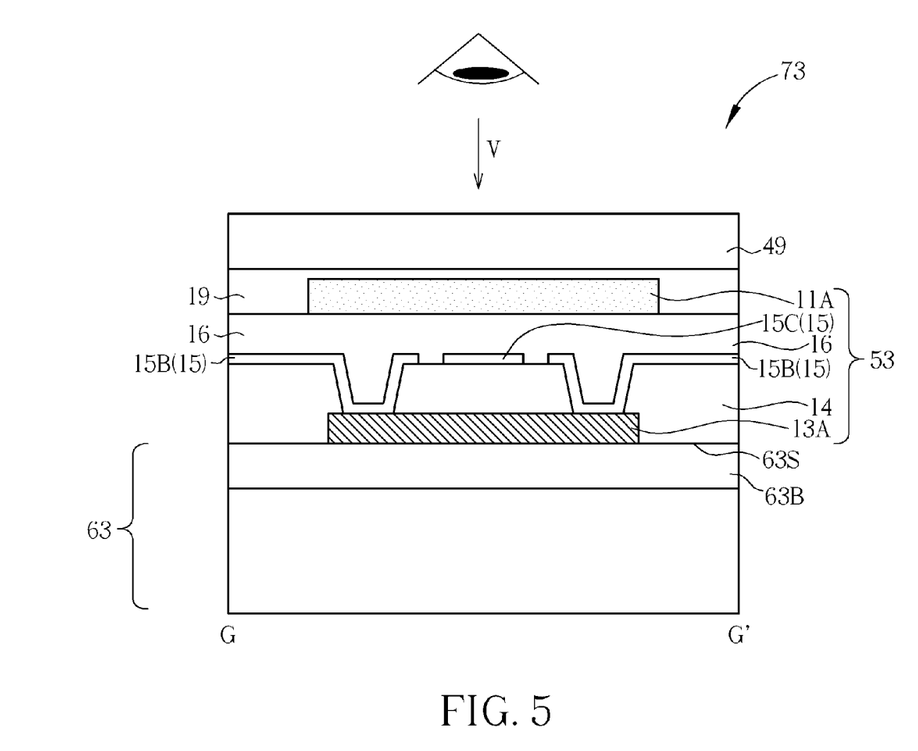
FIG. 5 is a schematic diagram illustrating is a cross-sectional view of a capacitive touch display panel along a line G-G' in FIG. 4 according to the third preferred embodiment of the present invention.

Please refer to FIGS. 4-5. FIG. 4 is a schematic diagram illustrating a top view of a capacitive touch display panel according to the third preferred embodiments of the present invention. FIG. 5 is a schematic diagram illustrating is a cross-sectional view of a capacitive touch display panel along a line G-G' in FIG. 4 according to the third preferred embodiment of the present invention. For emphasizing the main features of the capacitive touch display panel in this embodiment, some components are not illustrated in FIG. 4. As shown in FIGS. 4-5, in this embodiment, the capacitive touch display panel 73 includes a display panel 63 and a capacitive touch device 53. The display panel 63 includes a display surface 63S and the upper substrate 63B. In this embodiment, the display panel 63 may include a liquid crystal display panel, an electroluminescent display panel, an electrophoretic display panel, or a plasma display panel, but the present invention is not limited to this. The capacitive touch device 53 is disposed on the upper substrate 63B of the display panel 63, and disposed on the display surface 63S of the display panel 63. The capacitive touch device 53 includes a plurality of first transparent electrodes 15A, at least one transparent bridge line 15C, a plurality of second transparent electrodes 15B, at least one non-transparent bridge line 13A, a first insulating layer 14, a passivation layer 16, and at least one patterned low reflective layer 11A. As shown in FIGS. 4-5, the first transparent electrodes 15A are disposed on the upper substrate 63B along a first direction Y, and the second transparent electrodes 15B are disposed on the upper substrate 63B along a second direction X. The transparent bridge line 15C is disposed on the upper substrate 63B and electrically connected to two adjacent first transparent electrodes 15A. The non-transparent bridge line 13A is disposed on the upper substrate 63B and partially overlaps two adjacent second transparent electrodes 15B for being electrically connected to the two adjacent second transparent electrodes 15B. In addition, the first insulating layer 14 is disposed between the non-transparent bridge line 13A and the transparent bridge line 15C. The passivation layer 16 covers the first transparent electrodes 15A, the second transparent electrodes 15B, the transparent bridge line 15C, and the non-transparent bridge line 13A. The patterned low reflective layer 11A is disposed on the passivation layer. The patterned low reflective layer 11A is disposed on a side of the non-transparent bridge line 13A opposite to the display panel 63. The non-transparent bridge line 13A is disposed between the patterned low reflective layer 11A and the upper substrate 63B. The patterned low reflective layer 11A overlaps the non-transparent bridge line 13A in a vertical projective direction V. Additionally, in this embodiment, an area of the patterned low reflective layer 11A may be substantially larger than or equal to an area of the non-transparent bridge line 13A, and the non-transparent bridge line 13A is completely covered by the patterned low reflective layer 11A for effectively preventing the reflection light from being generated by the non-transparent bridge line 13A. It is worth noticing that, in this embodiment, the capacitive touch device 53 is disposed directly on the upper substrate 63B of the display panel 63, and the total manufacturing steps of the capacitive touch display panel may be effectively reduced. In addition, the upper substrate 63B may include a transparent substrate or a color filter substrate, but the upper substrate of the present invention is not limited to this and may include other appropriate substrates. The capacitive touch display panel 73 is one kind of on-cell touch display panels. When the display panel 63 is a liquid crystal display panel, a polarizing film (not shown) may be disposed on the capacitive touch device 53 for the requirement of the liquid crystal display panel structure.

As shown in FIG. 5, for other design purposes, an outer substrate 49 may be selectively disposed on a side of the capacitive touch device 53 opposite to the display panel 63, and the capacitive touch device 53 may then be disposed between the outer substrate 49 and the display panel 63. A second adhesive layer 19 may be disposed between the outer substrate 49 and the capacitive touch device 53 for combining the outer substrate 49 with the capacitive touch device 53. The outer substrate 49 is used to further protect the capacitive touch device 53 and enhance the reliability of the capacitive touch display panel 73.

Figure 6:
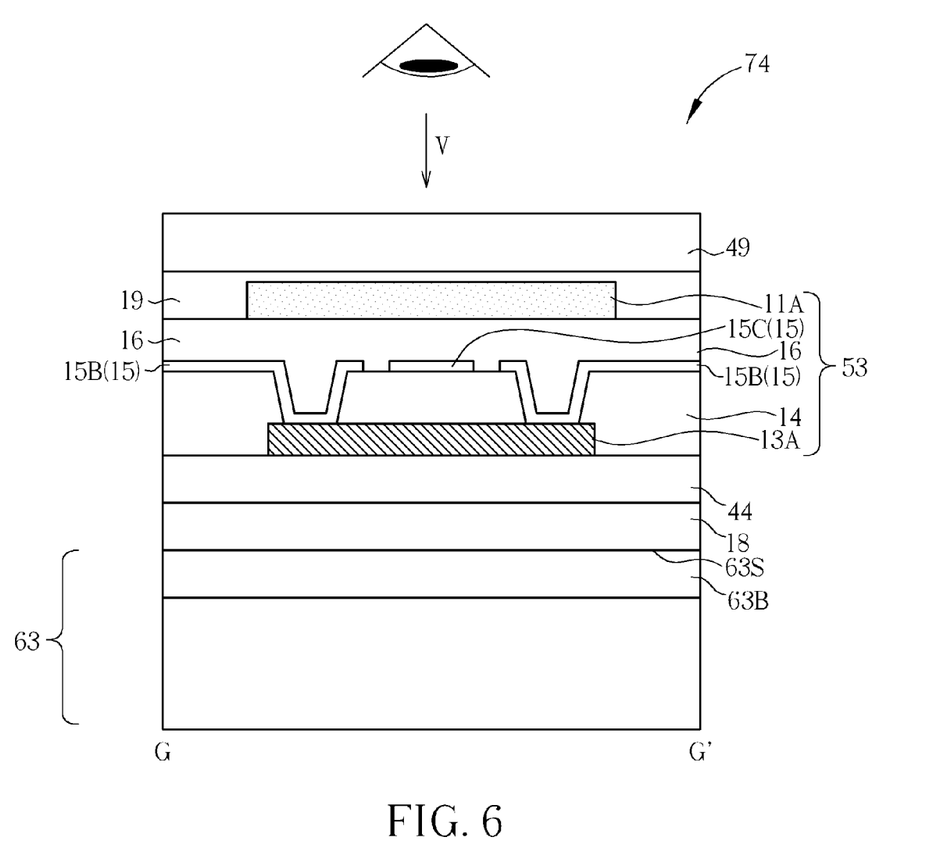
FIG. 6 is a schematic diagram illustrating is a cross-sectional view of a capacitive touch display panel along a line G-G' in FIG. 4 according to the fourth preferred embodiment of the present invention.

Please refer to FIG. 6, and refer to FIG. 4 together. FIG. 4 is a schematic diagram illustrating a top view of a capacitive touch display panel according to the fourth preferred embodiment of the present invention. FIG. 6 is a schematic diagram illustrating is a cross-sectional view of a capacitive touch display panel along a line G-G' in FIG. 4 according to the fourth preferred embodiment of the present invention. As shown in FIG. 4 and FIG. 6, in this embodiment, the capacitive touch display panel 74 includes a display panel 63, a capacitive touch device 53, an auxiliary substrate 44, and a first adhesive layer 18. The display panel 63 includes an upper substrate 63B and a display surface 63S. In this embodiment, the display panel 63 may include a liquid crystal display panel, an electroluminescent display panel, an electrophoretic display panel, or a plasma display panel, but the present invention is not limited to this. The auxiliary substrate 44 is disposed between the display panel 63 and the capacitive touch device 53. The capacitive touch device 53 is disposed directly on the auxiliary substrate 44. The first adhesive layer 18 is disposed between the auxiliary substrate 44 and the display panel 63 for combining the auxiliary substrate 44 with the display panel 63. The components' allocation and material properties in this embodiment are identical to those of the third embodiment mentioned above and will not be redundantly described. Additionally, it is worth noticing that the capacitive touch device 53 of the capacitive touch display panel 74 is disposed directly on the auxiliary substrate 44 in this embodiment, and then combined with the display panel 63 by the first adhesive layer 18. Therefore, the capacitive touch display panel 74 is one kind of out-cell touch display panels. Under this design, the display panel 63 and the capacitive touch device 53 may be manufactured separately, and then it may be easier to modify each of the manufacturing steps and beneficial for yield enhancement. As shown in FIG. 6, for other design purposes, an outer substrate 49 may be selectively disposed on a side of the capacitive touch device 53 opposite to the display panel 63. A second adhesive layer 19 may be disposed between the outer substrate 49 and the capacitive touch device 53 for combining the outer substrate 49 with the capacitive touch device 53. The outer substrate 49 is used to further protect the capacitive touch device 53 and enhance the reliability of the capacitive touch display panel 74.

Figure 7:
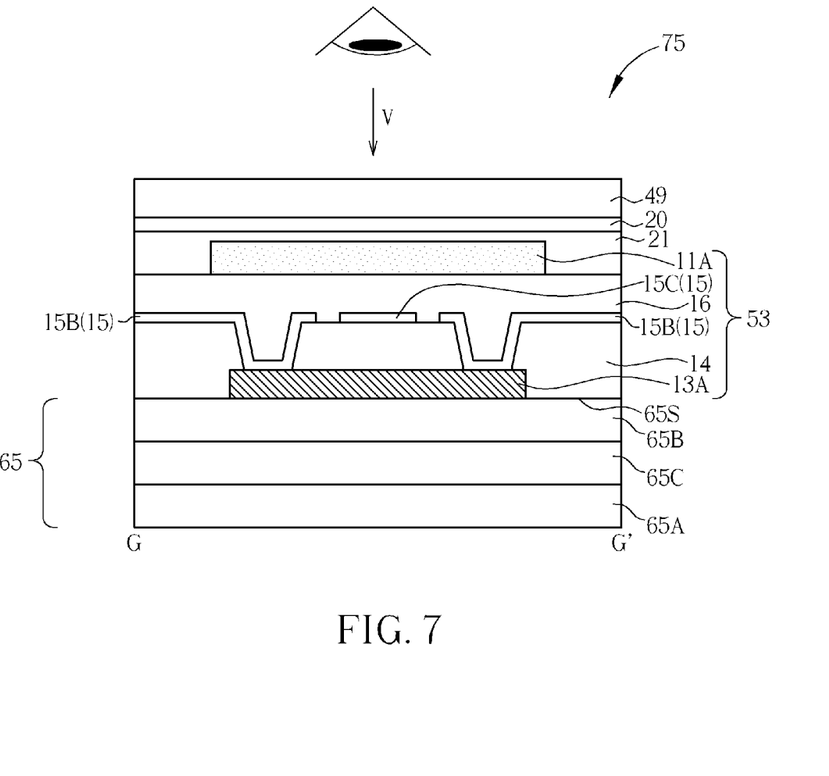
FIG. 7 is a schematic diagram illustrating is a cross-sectional view of a capacitive touch display panel along a line G-G' in FIG. 4 according to the fifth preferred embodiment of the present invention.

Please refer to FIG. 7, and refer to FIG. 4 together. FIG. 4 is a schematic diagram illustrating a top view of a capacitive touch display panel according to the fifth preferred embodiments of the present invention. FIG. 7 is a schematic diagram illustrating is a cross-sectional view of a capacitive touch display panel along a line G-G' in FIG. 4 according to the fifth preferred embodiment of the present invention. As shown in FIG. 4 and FIG. 7, the capacitive touch display panel 75 includes a liquid crystal display panel 65, a capacitive touch device 53, a polarizing film 21, an adhesive layer 20, and an outer substrate 49. The liquid crystal display panel 65 includes an upper substrate 65B, a lower substrate 65A, a liquid crystal layer 65C, and a display surface 65S. The capacitive touch device 53 is disposed on the upper substrate 65B of the liquid crystal display panel 65, and disposed on the display surface 65S of the liquid crystal display panel 65. The polarizing film 21 is disposed on the capacitive touch device 53. The adhesive layer 20 is disposed on the polarizing film 21. The outer substrate 49 is disposed on the adhesive layer 20. The adhesive layer 20 is used to combine the outer substrate 49 with the polarizing film 21. In addition, the capacitive touch device 53 includes a plurality of first transparent electrodes 15A, at least one transparent bridge line 15C, a plurality of second transparent electrodes 15B, at least one non-transparent bridge line 13A, a first insulating layer 14, a passivation layer 16, and at least one patterned low reflective layer 11A. As shown in FIG. 4 and FIG. 7, the first transparent electrodes 15A are disposed on the upper substrate 65B along a first direction Y, and the second transparent electrodes 15B are disposed on the upper substrate 65B along a second direction X. The transparent bridge line 15C is disposed on the upper substrate 65B and electrically connected to two adjacent first transparent electrodes 15A. The non-transparent bridge line 13A is disposed on the upper substrate 65B and partially overlaps two adjacent second transparent electrodes 15B for being electrically connected to the two adjacent second transparent electrodes 15B. In addition, the first insulating layer 14 is disposed between the non-transparent bridge line 13A and the transparent bridge line 15C. The passivation layer 16 covers the first transparent electrodes 15A, the second transparent electrodes 15B, the transparent bridge line 15C, and the non-transparent bridge line 13A. The patterned low reflective layer 11A is disposed on the passivation layer. The patterned low reflective layer 11A is disposed on a side of the non-transparent bridge line 13A opposite to the display panel 65. The non-transparent bridge line 13A is disposed between the patterned low reflective layer 11A and the upper substrate 65B. The patterned low reflective layer 11A overlaps the non-transparent bridge line 13A in a vertical projective direction V. Additionally, in this embodiment, an area of the patterned low reflective layer 11A may be substantially larger than or equal to an area of the non-transparent bridge line 13A, and the non-transparent bridge line 13A is completely covered by the patterned low reflective layer 11A for effectively preventing the reflection light from being generated by the non-transparent bridge line 13A. Additionally, in this embodiment, the upper substrate 65B may include a transparent substrate or a color filter substrate, but the upper substrate of the present invention is not limited to this and may include other appropriate substrates. In this embodiment, the capacitive touch display panel 75 is one kind of on-cell touch display panels.

Figure 8:
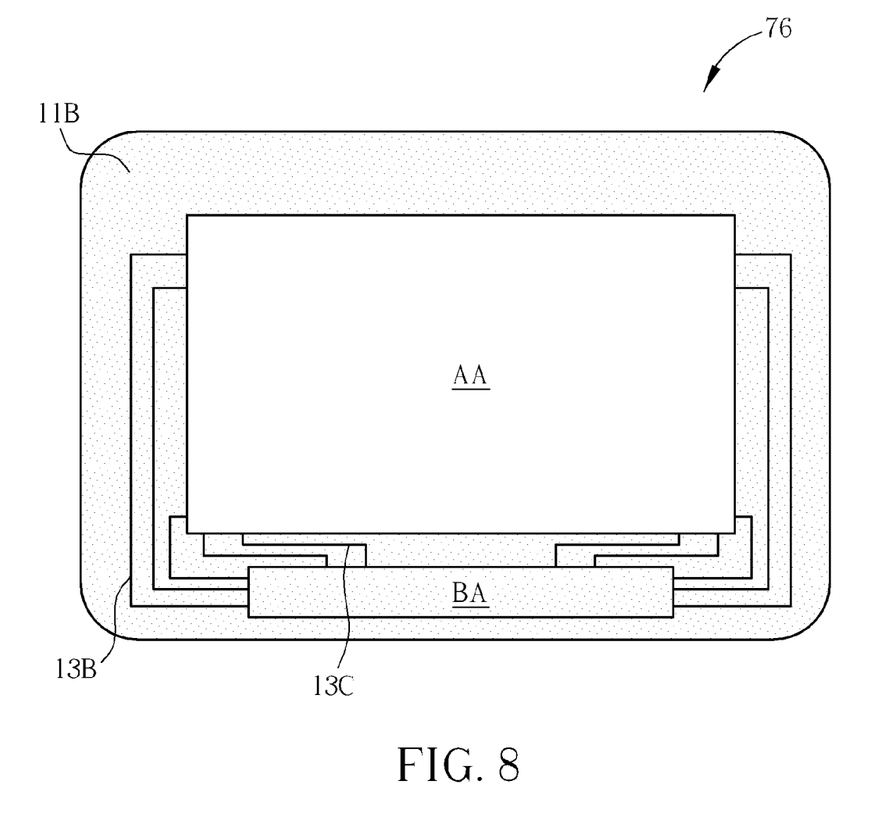
FIGS. 8-9 are schematic diagrams illustrating a top view of a capacitive touch display panel according to a preferred embodiment of the present invention.
Figure 9:
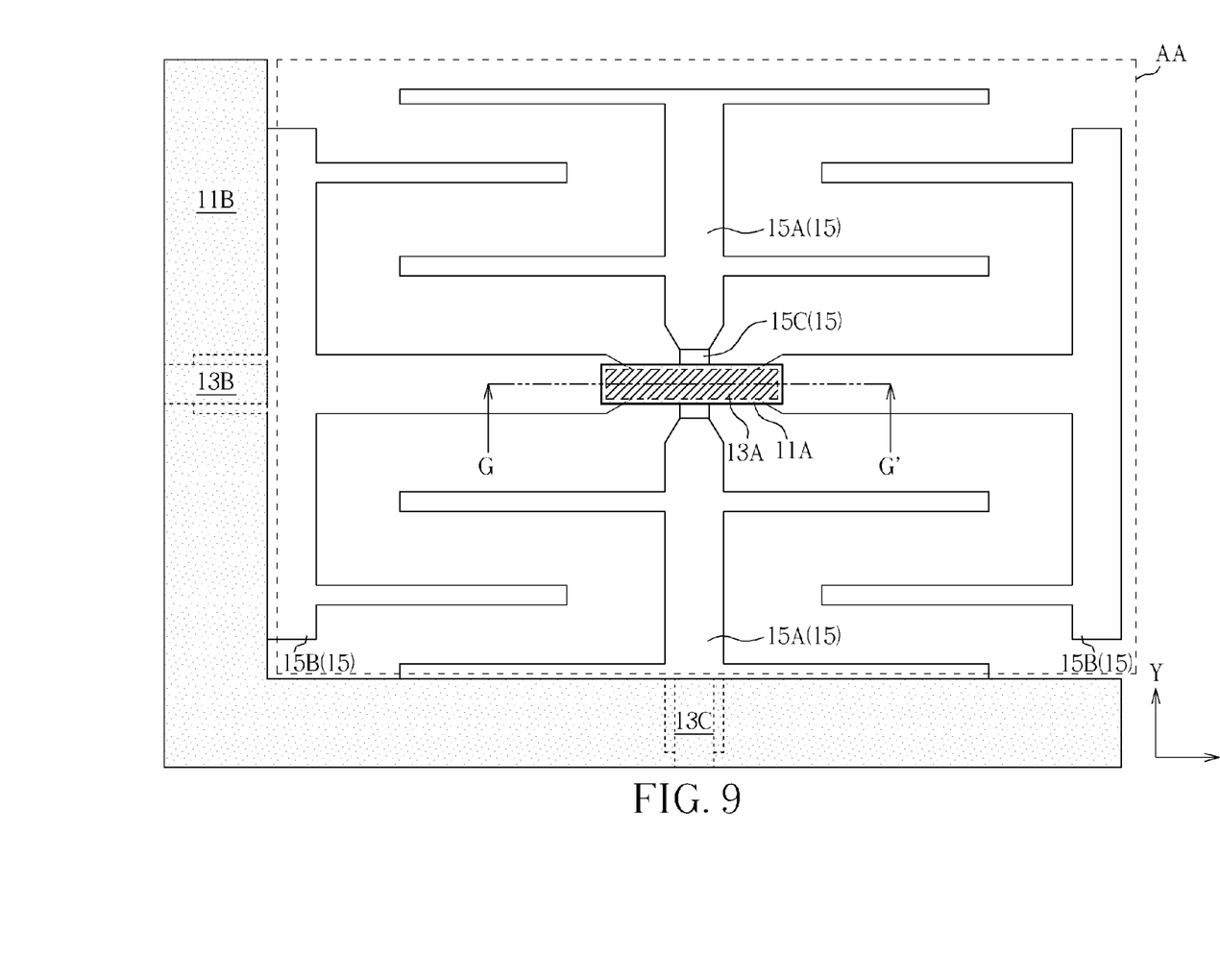

Please refer to FIGS. 8-9. FIGS. 8-9 are schematic diagrams illustrating a top view of a capacitive touch display panel according to a preferred embodiment of the present invention. FIG. 9 is a schematic diagram illustrating a locally enlarged view of the capacitive touch display panel in FIG. 8. As shown in FIG. 8, the capacitive touch display panel 76 includes an active region AA, a plurality of conducting lines 13B, a plurality of conducting lines 13C, at least one signal transferring region BA, and a peripheral decoration layer 11B. As sown in FIG. 9, the active region AA includes a plurality of first transparent electrodes 15A, at least a transparent bridge line 15C, a plurality of second transparent electrodes 15B, at least one non-transparent bridge line 13A, and at least a patterned low reflective layer 11A. Additionally, any one of the manufacturing methods described above may be applied to the first electrodes 15A, the transparent bridge line 15C, the second transparent electrodes 15B, the non-transparent bridge line 13A, and the patterned low reflective layer 11A in this embodiment, and will not be redundantly described. As shown in FIGS. 8-9, the conducting lines 13B are used to electrically connect the second transparent electrodes 15B with the signal transferring region BA, and the conducting lines 13C are used to electrically connect the first transparent electrodes 15A with the signal transferring region BA. In this embodiment, the signals of the electrical properties, which are sensed by the first transparent electrodes 15A and the second electrodes 15B around the touch point, are transferred to the signal transferring region BA via the conducting lines 13B/13C for further processing. Additionally, the capacitive touch display panel 76 may include a peripheral decoration layer 11B disposed around the active region AA. The peripheral decoration layer 11B covers the conducting lines 13B/13C. Therefore, the decoration effect may be generated by covering the conducting lines, outer circuits, and outer devices outside the active region AA with the peripheral decoration layer 11B. It is worth noticing that the peripheral decoration layer 11B and the patterned low reflective layer 11A may be made of an identical material for process reduction purpose, but the present invention is not limited to this.

Figure 10:
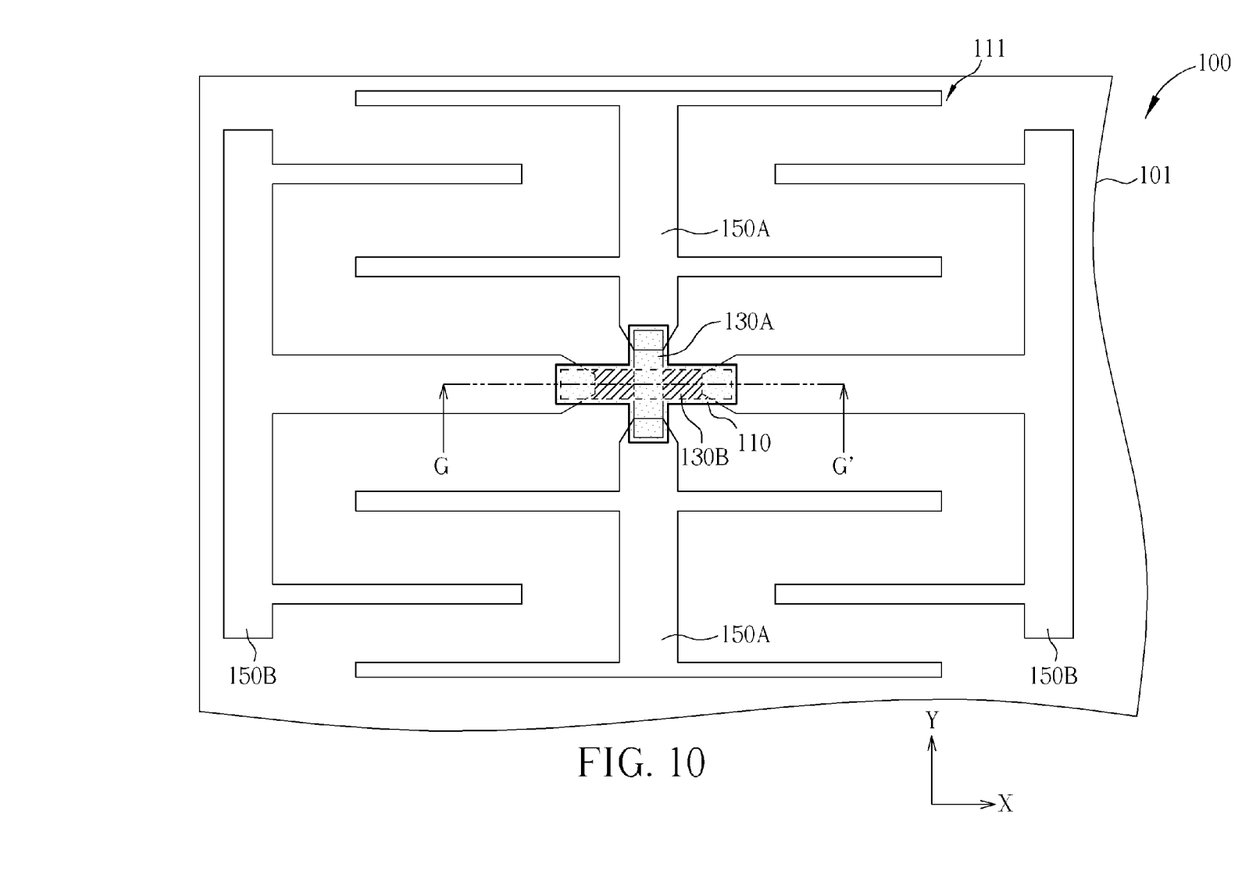
FIG. 10 is a schematic diagram illustrating a top view of a capacitive touch display panel according to another preferred embodiment of the present invention.

Please refer to FIG. 10. FIG. 10 is a schematic diagram illustrating a top view of a capacitive touch display panel according to another preferred embodiment of the present invention. The transparent bridge lines described in the above embodiments may be replaced by non-transparent bridge lines in this embodiment. For emphasizing the main features of the capacitive touch display panel in this embodiment, some of the components are not illustrated in FIG. 10. The cross-sectional view of the structure of the capacitive touch display panel in this embodiment may be referred to any one of the embodiments described above in FIG. 2, FIG. 3, FIG. 5, FIG. 6, and FIG. 7. The structure of the capacitive touch display panel in this embodiment will not be redundantly described. As shown in FIG. 10, a capacitive touch display panel 100 includes a substrate 101. The substrate 101 may include the outer substrate in the above-mentioned first preferred embodiment and the above-mentioned second preferred embodiment, the upper substrate in the above-mentioned third preferred embodiment, or the auxiliary substrate in the above-mentioned fourth preferred embodiment. A capacitive touch device 111 is disposed on the substrate 101. The capacitive touch device 111 includes a plurality of first transparent electrodes 150A, at least one first non-transparent bridge line 130A, a plurality of second transparent electrodes 150B, at least one second non-transparent bridge line 130B, and at least one patterned low reflective layer 110. As shown in FIG. 10, the first transparent electrodes 150A are disposed on the substrate 101 along a first direction Y, and the second transparent electrodes 150B are disposed on the substrate 101 along a second direction X. Additionally, the first non-transparent bridge line 130A is disposed on the substrate 101 and electrically connected to two adjacent first transparent electrodes 150A. The second non-transparent bridge line 130B is disposed on the substrate 101 and partially overlaps two adjacent second transparent electrodes 150B for being electrically connected to the two adjacent second transparent electrodes 150B. The patterned low reflective layer 110 is disposed on the first non-transparent bridge line 130A and the second non-transparent bridge line 130B. In this embodiment, for different design purposes, the patterned low reflective layer 110 may be disposed between the substrate 101 and the first non-transparent bridge line 130A/the second non-transparent bridge line 130B, which is similar to the structures illustrated in FIG. 2 and FIG. 3, or the patterned low reflective layer 110 may be disposed on the substrate 101, the first non-transparent bridge line 130A, and the second non-transparent bridge line 130B, which is similar to the structures illustrated in FIG. 5 and FIG. 7. Additionally, the patterned low reflective layer 110 overlaps the first non-transparent bridge line 130A/the second non-transparent bridge line 130B in a vertical projective direction V. In addition, it is worth noticing that an area of the patterned low reflective layer 110 may be substantially larger than or equal to an area of the first non-transparent bridge line 130A/the second non-transparent bridge line 130B, and the first non-transparent bridge line 130A and the second non-transparent bridge line 130B are completely covered by the patterned low reflective layer 110 for effectively preventing the reflection light from being generated by the first non-transparent bridge line 130A and the second non-transparent bridge line 130B. In alternative embodiments, the patterned low reflective layer 110 may be a cross pattern for corresponding to the patterns of the first non-transparent bridge line 130A and the second non-transparent bridge line 130B, when the first non-transparent bridge line 130A and the second non-transparent bridge line 130B are crossed to present a cross shape. In this embodiment, a material of a patterned transparent conductive layer 15, which is used to form the first transparent electrodes 150A and the second transparent electrodes 150B, may include such as indium tin oxide, indium zinc oxide, aluminum zinc oxide, or other appropriate transparent conductive materials. Additionally, a material of the patterned low reflective layer 110 may include a black light-shielding material, such as black resin, chromium oxide, or chromium oxynitride, but the patterned low reflective layer 110 of the present invention is not limited to this and may be made of other low reflective materials with appropriate optical density for effectively blocking the environment light from reaching the first non-transparent bridge line 130A and the second non-transparent bridge line 130B.

To summarize the above description, in the present invention, the patterned low reflective layer is employed to prevent the reflection light from being generated by the bridge lines and other conductive lines with light reflectivity, and the display performance of the capacitive touch display panel may then not be affected by the reflection light. The process integration is also employed in the present invention to decrease the influence on the complexity of the manufacturing process which includes forming the patterned low reflective layer. Therefore, the display performance of the capacitive touch display panel in the present invention may be effectively enhanced without increasing the complexity of the manufacturing process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive touch display panel, comprising:
a display panel having a display surface;
an outer substrate, disposed on the display surface of the display panel; and
a capacitive touch device, disposed between the outer substrate and the display panel, wherein the capacitive touch device comprises:
a plurality of first transparent electrodes, disposed on the outer substrate along a first direction;
at least one transparent bridge line, disposed on the outer substrate and electrically connected to two adjacent first transparent electrodes;
a plurality of second transparent electrodes, disposed on the outer substrate along a second direction;
at least one non-transparent bridge line, disposed on the outer substrate, wherein the non-transparent bridge line partially overlaps two adjacent second transparent electrodes for being electrically connected to the two adjacent second transparent electrodes; and
at least one patterned low reflective layer, disposed on a side of the non-transparent bridge line opposite to the display panel, wherein the patterned low reflective layer is disposed between the outer substrate and the non-transparent bridge line, and the patterned low reflective layer overlaps the non-transparent bridge line in a vertical projective direction.

2. The capacitive touch display panel of claim 1, wherein an area of the patterned low reflective layer is substantially larger than or equal to an area of the non-transparent bridge line, and the non-transparent bridge line is completely covered by the patterned low reflective layer.

3. The capacitive touch display panel of claim 1, wherein the first transparent electrodes, the transparent bridge lines, and the second transparent electrodes are made of a patterned transparent conductive layer.

4. The capacitive touch display panel of claim 3, further comprising an adhesive layer disposed between the display panel and the capacitive touch device for combining the display panel with the capacitive touch device, wherein the capacitive touch device is disposed on an inner surface of the outer substrate.

5. The capacitive touch display panel of claim 1, further comprising a first insulating layer disposed between the non-transparent bridge line and the transparent bridge line.

6. The capacitive touch display panel of claim 4, further comprising a passivation layer disposed between the capacitive touch device and the adhesive layer.

7. The capacitive touch display panel of claim 1, further comprising a second insulating layer disposed between the non-transparent bridge line and the patterned low reflective layer.

8. The capacitive touch display panel of claim 1, wherein a material of the patterned low reflective layer includes a black light-shielding material.

9. The capacitive touch display panel of claim 1, further comprising a peripheral decoration layer and an active region, wherein the peripheral decoration layer is disposed around the active region.

10. The capacitive touch display panel of claim 9, wherein the peripheral decoration layer and the patterned low reflective layer are made of an identical material.

11. A capacitive touch display panel, comprising:
a display panel comprising an upper substrate and a display surface; and
a capacitive touch device, disposed on the upper substrate of the display panel, and disposed on the display surface of the display panel, wherein the capacitive touch device comprises:
a plurality of first transparent electrodes, disposed on the upper substrate along a first direction;
at least one transparent bridge line, disposed on the upper substrate and electrically connected to two adjacent first transparent electrodes;
a plurality of second transparent electrodes, disposed on the upper substrate along a second direction;
at least one non-transparent bridge line, disposed on the upper substrate, wherein the non-transparent bridge line partially overlaps two adjacent second transparent electrodes for being electrically connected to the two adjacent second transparent electrodes; and
at least one patterned low reflective layer, disposed on a side of the non-transparent bridge line opposite to the display panel, wherein the non-transparent bridge line is disposed between the patterned low reflective layer and the upper substrate, and the patterned low reflective layer overlaps the non-transparent bridge line in a vertical projective direction.

12. The capacitive touch display panel of claim 11, wherein an area of the patterned low reflective layer is substantially larger than or equal to an area of the non-transparent bridge line, and the non-transparent bridge line is completely covered by the patterned low reflective layer.

13. The capacitive touch display panel of claim 11, wherein the first transparent electrodes, the transparent bridge lines, and the second transparent electrodes are made of an identical patterned transparent conductive layer.

14. The capacitive touch display panel of claim 13, further comprising a first insulating layer disposed between the non-transparent bridge line and the transparent bridge line.

15. The capacitive touch display panel of claim 11, wherein the capacitive touch device is disposed directly on the upper substrate of the display panel.

16. The capacitive touch display panel of claim 11, further comprising an auxiliary substrate disposed between the display panel and the capacitive touch device, and the capacitive touch device is disposed directly on the auxiliary substrate.

17. The capacitive touch display panel of claim 16, further comprising a first adhesive layer disposed between the auxiliary substrate and the display panel for combining the auxiliary substrate with the display panel.

18. The capacitive touch display panel of claim 11, further comprising an outer substrate disposed on a side of the capacitive touch device opposite to the display panel, wherein the capacitive touch device is disposed between the outer substrate and the display panel.

19. The capacitive touch display panel of claim 18, further comprising a second adhesive layer disposed between the outer substrate and the capacitive touch device for combining the outer substrate with the capacitive touch device.

20. The capacitive touch display panel of claim 11, further comprising a peripheral decoration layer and an active region, wherein the peripheral decoration layer is disposed around the active region.

21. The capacitive touch display panel of claim 20, wherein the peripheral decoration layer and the patterned low reflective layer are made of an identical material.

22. The capacitive touch display panel of claim 20, further comprising a passivation layer covering the first transparent electrodes, the second transparent electrodes, the transparent bridge line, and the non-transparent bridge line.

23. A capacitive touch display panel, comprising:
a liquid crystal display panel comprising an upper substrate and a display surface;
a capacitive touch device, disposed on the upper substrate of the liquid crystal display panel, and disposed on the display surface of the liquid crystal display panel, wherein the capacitive touch device comprises:
a plurality of first transparent electrodes, disposed on the upper substrate along a first direction;
at least one transparent bridge line, disposed on the upper substrate and electrically connected to two adjacent first transparent electrodes;
a plurality of second transparent electrodes, disposed on the upper substrate along a second direction;
at least one non-transparent bridge line, disposed on the upper substrate, wherein the non-transparent bridge line partially overlaps two adjacent second transparent electrodes for being electrically connected to the two adjacent second transparent electrodes;

a passivation layer, covering the first transparent electrodes, the second transparent electrodes, the transparent bridge line, and the non-transparent bridge line; and
at least one patterned low reflective layer, disposed on a side of the non-transparent bridge line opposite to the liquid crystal display panel, wherein the non-transparent bridge line is disposed between the patterned low reflective layer and the upper substrate, and the patterned low reflective layer overlaps the non-transparent bridge line in a vertical projective direction;
a polarizing film, disposed on the capacitive touch device;
an adhesive layer, disposed on the polarizing film; and
an outer substrate, disposed on the adhesive layer.

24. A capacitive touch display panel, comprising:
a display panel comprising an upper substrate and a display surface;
an auxiliary substrate, disposed on the upper substrate of the display panel, and disposed on the display surface of the display panel; and
a capacitive touch device, disposed on the auxiliary substrate, wherein the capacitive touch device comprises:
a plurality of first transparent electrodes, disposed on the auxiliary substrate along a first direction;
at least one transparent bridge line, disposed on the auxiliary substrate for being electrically connected to two adjacent first transparent electrodes;
a plurality of second transparent electrodes, disposed on the auxiliary substrate along a second direction;
at least one non-transparent bridge line, disposed on the auxiliary substrate, wherein the non-transparent bridge line partially overlaps two adjacent second transparent electrodes for being electrically connected to the two adjacent second transparent electrodes; and
at least one patterned low reflective layer, disposed on a side of the non-transparent bridge line opposite to the display panel, wherein the non-transparent bridge line is disposed between the patterned low reflective layer and the auxiliary substrate, and the patterned low reflective layer overlaps the non-transparent bridge line in a vertical projective direction.

25. The capacitive touch display panel of claim 24, further comprising a first adhesive layer disposed between the auxiliary substrate and the display panel for combining the auxiliary substrate with the display panel.

26. The capacitive touch display panel of claim 24, further comprising an outer substrate disposed on a side of the capacitive touch device opposite to the display panel, wherein the capacitive touch device is disposed between the outer substrate and the display panel.

27. The capacitive touch display panel of claim 26, further comprising a second adhesive layer disposed between the outer substrate and the capacitive touch device for combining the outer substrate with the capacitive touch device.

28. A capacitive touch display panel, comprising:
a substrate; and
a capacitive touch device, disposed on the substrate, wherein the capacitive touch device comprises:
a plurality of transparent electrodes, disposed on the substrate;
at least one non-transparent bridge line, disposed on the substrate, wherein the non-transparent bridge line partially overlaps two adjacent transparent electrodes for being electrically connected to the two adjacent transparent electrodes; and at least one patterned low reflective layer, disposed on the substrate, wherein the patterned low reflective layer overlaps the non-transparent bridge line in a vertical projective direction.

29. The capacitive touch display panel of claim 28, wherein the transparent electrodes comprise a plurality of first transparent electrodes and a plurality of second transparent electrodes, and the non-transparent bridge line comprises a first non-transparent bridge line and a second non-transparent bridge line.

30. A capacitive touch display panel, comprising:
   an outer substrate, having an inner surface; and
   a capacitive touch device, disposed on the inner surface of the outer substrate, wherein the capacitive touch device comprises:
      at least one patterned low reflective layer, disposed on the inner surface of the outer substrate;
      at least one non-transparent bridge line, disposed over the patterned low reflective layer, wherein the patterned low reflective layer and the non-transparent bridge line are overlapped in a vertical projective direction; and
      a plurality of transparent electrodes, disposed on the outer substrate, wherein the non-transparent bridge line partially overlaps two adjacent transparent electrodes for being electrically connected to the two adjacent transparent electrodes.

31. The capacitive touch display panel of claim 30, further comprises a display panel having a display surface facing the outer substrate, wherein the display panel is combined with the outer substrate, and the capacitive touch device is located between the outer substrate and the display panel.

\* \* \* \* \*